United States Patent
Janakiram

(10) Patent No.: US 9,443,106 B2
(45) Date of Patent: Sep. 13, 2016

(54) FILTERING MEANS FOR TRACKING INFORMATION FLOW IN ANDROID OPERATED DEVICES

(71) Applicant: Indian Institute of Technology Madras, Chennai, State of Tamil Nadu (IN)

(72) Inventor: Dharanipragada Janakiram, Chennai (IN)

( * ) Notice: Subject to any disclaimer, the term of this patent is extended or adjusted under 35 U.S.C. 154(b) by 0 days.

(21) Appl. No.: 14/568,683

(22) Filed: Dec. 12, 2014

(65) Prior Publication Data

US 2015/0169887 A1    Jun. 18, 2015

(30) Foreign Application Priority Data

Dec. 13, 2013 (IN) .......................... 5778/CHE/2013

(51) Int. Cl.
*G06F 9/54* (2006.01)
*G06F 21/62* (2013.01)

(52) U.S. Cl.
CPC .............. *G06F 21/629* (2013.01); *G06F 9/54* (2013.01); *G06F 9/545* (2013.01); *G06F 2209/542* (2013.01)

(58) Field of Classification Search
CPC ........ G06F 21/00; G06F 21/16; G06F 21/60; G06F 21/78; G06F 21/82; G06F 21/88; G06F 9/54; H04L 63/00; H04L 63/0245; H04L 63/14; H04L 63/1408; H04L 63/1416; H04L 63/30; H04L 63/308
See application file for complete search history.

(56) References Cited

U.S. PATENT DOCUMENTS

| | | | | |
|---|---|---|---|---|
| 8,913,721 B1* | 12/2014 | Narayanan | .......... | G06F 21/6245 345/626 |
| 9,159,035 B1* | 10/2015 | Ismael | ................. | G06N 99/005 |
| 2004/0250131 A1* | 12/2004 | Swander | ............. | H04L 63/0263 726/11 |
| 2005/0108516 A1* | 5/2005 | Balzer | .................... | G06F 21/52 713/150 |
| 2007/0039044 A1* | 2/2007 | Moonen | ............. | H04L 63/0227 726/13 |
| 2009/0049557 A1* | 2/2009 | Friedman | ............. | G06F 21/606 726/27 |
| 2010/0329269 A1* | 12/2010 | Selitser | ............... | H04L 12/5895 370/401 |
| 2011/0138485 A1* | 6/2011 | Tien | ....................... | G06F 21/554 726/30 |
| 2011/0153368 A1* | 6/2011 | Pierre | .................. | G06Q 10/067 705/4 |
| 2013/0212710 A1* | 8/2013 | Puttaswamy Naga | ................... | H04L 63/0245 726/30 |
| 2013/0232540 A1* | 9/2013 | Saidi | ................... | G06F 21/6218 726/1 |
| 2013/0339514 A1* | 12/2013 | Crank | ................ | H04L 63/1408 709/224 |
| 2014/0007139 A1* | 1/2014 | Janssen | ................. | G06F 9/4411 719/321 |
| 2014/0007184 A1* | 1/2014 | Porras | .................... | G06F 21/53 726/1 |
| 2014/0334303 A1* | 11/2014 | Ma | .................... | H04W 28/0268 370/235 |

FOREIGN PATENT DOCUMENTS

DE    102011117855 A1    5/2013
EP    2385479 A1    11/2011

* cited by examiner

*Primary Examiner* — Eric W Shepperd
(74) *Attorney, Agent, or Firm* — Seyfarth Shaw LLP; Brian Michaelis

(57) ABSTRACT

Security features of an ANDROID® operating system device using a data flow tracking filter are described. The data flow tracking filter uses a message filter model to track sensitive data in the ANDROID® operating system device through I/O channels to provide users with control over when the data attempts to leave the device through a network interface, thus exposing how third party applications use user private data. The data tracking filter also enables operating at the kernel level so intercept of all standard channels of communication is possible.

4 Claims, 3 Drawing Sheets

FILTERING MEANS FOR TRACKING INFORMATION FLOW IN ANDROID OPERATED DEVICES

CROSS-REFERENCE TO RELATED APPLICATION DATA

This non-provisional application claims priority to India application no. 5778/CHE/2013 filed on Dec. 13, 2013.

FIELD

This disclosure relates generally to computer security and, more particularly, to security policies for tracking information flow within an ANDROID® operating device.

BACKGROUND

Currently ANDROID® operating system users are unaware and have no control as to how third party applications use their private data. For example, if a user allows an application to access his/her contacts, he/she has no way of knowing if the application sends the contacts to advertisers or any other external entity. Generally, one security feature of the ANDROID® operating system is application-defined and permission must be granted by a user. However, once the user grants permission to the third-party application, the user has no way of knowing how the application uses the user's private data.

European application no. 2385479 A1 describes systems, methods, devices, and machine-readable mediums for implementing gesture-based signature authentication. In one embodiment, a method may involve generating a data protection policy from an un-trusted software environment to govern access to protected data stored in memory in the local computer system. Then the method maps the data protection policy to an enforceable system-level data protection policy managed by an Information Flow and Tracking Protection (IFTP) logic. Next, the method flags the first memory page containing the protected data. Finally, the method enforces the generated data protection policy for the first memory page containing the protected data using the IFTP logic and the enforceable system-level data protection policy.

German application no. 102011117855 A1 provides a technical improvement for mobile clients to protect against malicious applications that have the potential to transmit personal information of customers to third parties without this being noticed by the customer. Other hazards may arise from applications that secretly gain control of microphone and/or camera and/or communication channels such as mobile network or Wi-Fi and so you can spy on the client's environment or expensive premium SMS messages at the expense of the customer. Against this, the method provides protection by warnings to the customer, with detailed breakdowns of potential and existing risks encountered. Other variants of the method outlined therein have structures that are imposed on the applications, making manipulation of destination addresses, or the pretense of addresses that are supposedly used is not possible. The takeover of customer input is hereby ensured that what the customer sees or enters is also accepted as genuine and used.

SUMMARY

The present disclosure proposes a data flow tracking filter that uses a message filter model to track sensitive data in an ANDROID® operating system through I/O channels such as files, sockets, and the like. Further, a user is alerted if data attempts to leave the device through a network interface.

BRIEF DESCRIPTION OF THE DRAWINGS

The particular features and advantages of the present disclosure will be apparent from the detailed description set forth below in conjunction with the drawings in which like reference characters identify corresponding aspects throughout.

DETAILED DESCRIPTION

The detailed description set forth herein makes reference to the accompanying drawings, which show various aspects of the present disclosure by way of illustration. While these various aspects are described in sufficient detail to enable those skilled in the art to practice the disclosure, it should be understood that other embodiments and implementations may be realized and that logical and mechanical changes may be made without departing from the scope of the disclosure. Thus, the detailed description herein is presented for purposes of illustration only and not of limitation. For example, the steps recited in any of the method or process descriptions may be executed in any order and are not limited to the order presented. Moreover, references to a singular embodiment may include plural embodiments, and references to more than one component may include a singular embodiment, for example.

The present disclosure provides a system for tracking sensitive data in an ANDROID® Operating System ("OS") device using a data flow tracking filter. This data flow tracking filter allows for a determination of what applications on the ANDROID® OS are doing, and allows for the identification of malicious or misbehaving applications. Data flow may be tracked through input/output ("I/O") channels such as files, sockets, and the like, and involves intercepting system calls. For example, when a read system call happens on a contacts database, the data may be written to a file/socket, sent to other processes through inter-process communication ("IPC") channels, or sent over a network. All these operations involve system calls, and by tracking these system calls, information flow may be tracked.

The filter model may be based on message filter abstraction for object oriented systems. Further, the Message Filter Model may handle a wide range of security issues and supports dynamic addition/deletion of the message filters. The Message Filter Model also allows for minimal changes to a core kernel, expressiveness, and ease-of-use maintenance.

Figure 1:
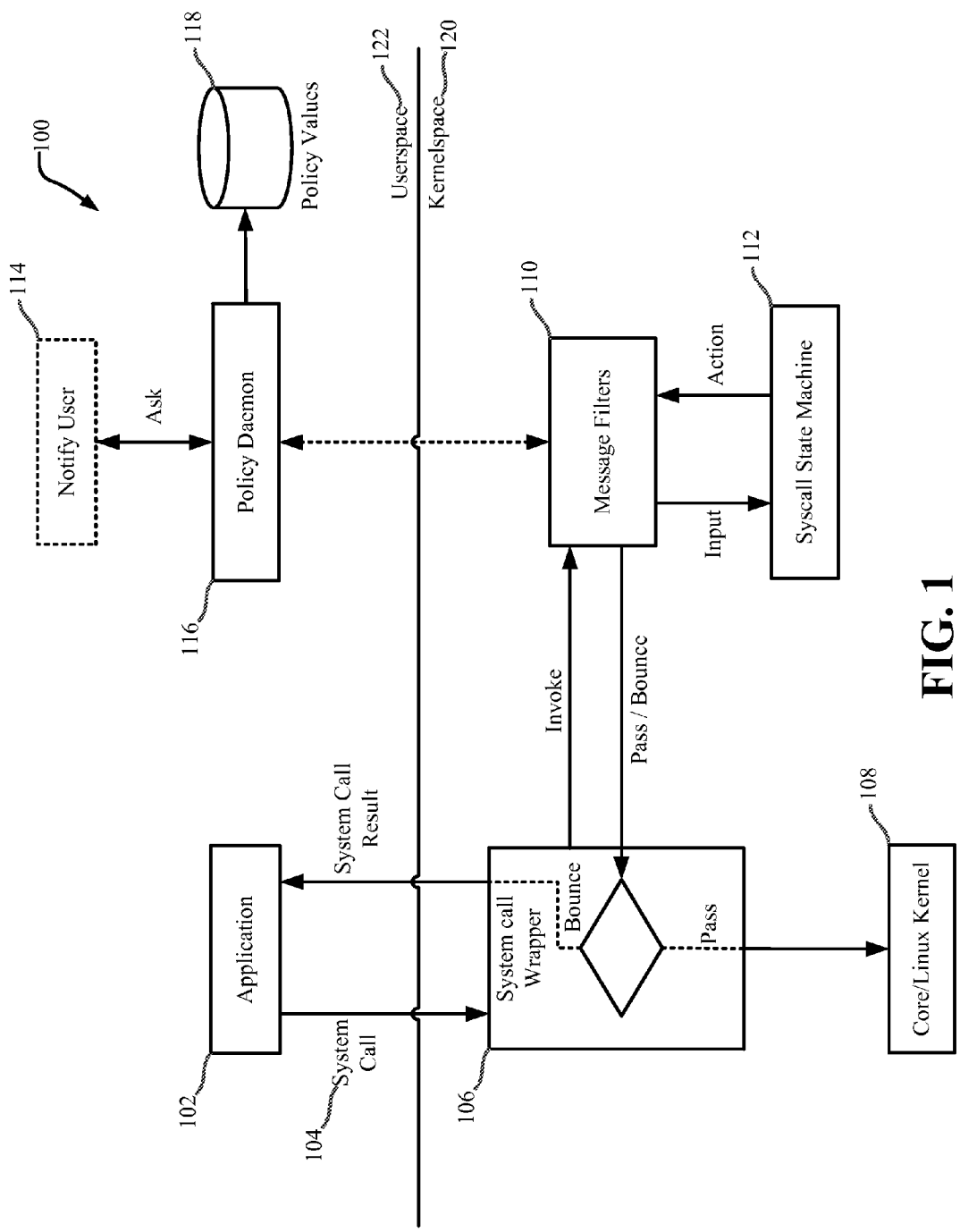
FIG. 1 is a block diagram of a device for utilizing a data flow tracking filter to track sensitive data according to the present disclosure.

Referring to FIG. 1, a device 100 for tracking sensitive data within an ANDROID® OS device using a data flow tracking filter is described. An application 102 on the device 100 may send a system call 104 to a system call wrapper 106. The system call wrapper 106 may be based on Object Oriented wrappers for a linux kernel 108. The system call wrapper 106 allows for transparent loading and unloading of the message filters 110. The system call wrapper 106, upon receiving the system call 104, invokes the message filters 110. The message filters 110 that are built on top of the system call wrapper 106 transparently intercept the system call 104 sent by the application 102. The message filters 110 may also add security policies at runtime.

The message filters 110 provide various filtering mechanisms to the core kernel 108, which may be, for example, a linux kernel. The message filters 110 may also handle device driver failures and protect the linux kernel 108 against the exploitation of bugs in the code. A Generic Message Filter abstraction model may be utilized.

The message filters 110 track user sensitive data by tracking system calls involving IPC through files/sockets and notifies the user (illustrated as block 114), by giving an alert to the user, if sensitive data attempts to leave the device through a network interface. The message filters 110 may further be used to implement policies for controlling simple and complex operations that involve one or more system calls 104. The message filters 110 may additionally be implemented as decorator pattern classes for the wrappers. Decorator pattern provides a way of adding additional responsibilities to the object dynamically.

Since the message filters 110 are at the kernel level, they are more efficient and more secure than user space system call interposition frameworks. Additionally, they are efficient because of one less context switch from kernel space 120 to user space 122 and secure because they are safe from manipulation from the other user space 122 processes. Also, the message filter is more expressive than the systrace policy framework.

A state machine 112 is utilized to maintain a call state of the system call 104. State transitions are triggered by system calls 104 and corresponding actions are performed by the message filters 110.

Security policies may include moderating access to privileged resources and controlling processes from performing privileged operations. Moderating access to a privileged resource may be accomplished by disallowing, or bouncing, a system call 104. Thus, policies may check arguments for the system call 104 and permit/pass or deny/bounce it. Controlling a privileged operation may be accomplished by tracking system calls 104. Tracking system calls 104 may include either matching the sequence of system calls 104 that define an operation, or maintaining the state machine 112 with state transitions being triggered by incoming system calls 104.

Loading and unloading of the message filters 110 is done by the policy daemon 116. The policy daemon 116 also acts as an interface to the policy values store 118. The policy values store 118 contains settings that may be modified by a user, and these settings are used by the message filters 110 to implement the policy logic. The policy daemon 116 also has the additional capability of asking the user when the filter is not able to come to a conclusive permit/deny decision. The message filters 110 maintain the system call state using the state machine 112. Based on the incoming system calls 104, state machine transitions happen and corresponding action is implemented by the message filters 110. When the message filters 110 are inserted into the core kernel 108, they get policy values from the policy daemon 116 through the/dev/mesgfilter character device and during unload any intermediate state is stored back to the policy values store 118. This communication with the policy daemon 116 happens during loading and unloading of the kernel module, it does not happen during the system calls 104.

The data flow tracking filter leverages the message filter model as the model works basically by intercepting system calls 104. The filter mainly tracks the following overt communication channels: files; sockets; and intents (through binder).

IPC in ANDROID® operating systems happens mainly through Intents. It is a message passing communication between application components. Intent is created by a developer using the Java API and is transmitted by Binder IPC. However, applications can also use files/sockets to communicate. Generally files of one application cannot be read by other applications. But if the permission of the file is made WORLD_READABLE, then any process in the system can access it. For socket communication channel to work, both the interacting applications must be running simultaneously.

IPC through files generally involves open/read/write system calls 104 and socket communication generally requires send/sendto/recv/recvfrom/sendmsg system calls 104. The system call state machine 112 is used to maintain the state across system call 104. The filter maintains a list of files that are considered sensitive such as a contacts database, Short Message Service ("SMS"), and the like and corresponding tags are maintained for the same.

A process can be in one of two states. Every process is in state-1 initially and state-2 implies that the process is in possession of sensitive information. The following scenarios evidence when a process can enter state-2: if the process performs a read call on a file which is considered sensitive; and if the process receives a message from another process which is in state-2 (socket or intent).

The message filters 110 intercept all the read/write system calls 104 made by the process and checks if the information being read is sensitive. If the file is a sensitive file, the state of the process is changed to state-2 and sensitive tags are copied from the file to the process. If the process in state-2 performs a write, then the corresponding file is added to a list of the sensitive files and tags are copied from process to file. If the process invokes a send( ) system call, the filter intercepts it and checks the state of the process. If it is in state-2 then the filter passes the relevant information, e.g., IP address and tags, to a service running in the user-space 122 which notifies the user by displaying an alert.

Accordingly, the data flow tracking filter of the present disclosure has many advantages. For instance, security policies may be built on top of the message filters 110 for tracking the information flow in the ANDROID® OS. The data flow tracking filter thus developed tracks the sensitive data through I/O channels and alerts the user if data leaves the device. Also, since the message filters 110 operate at the kernel level, it is possible to intercept all standard channels of communication. Furthermore, the data tracking filter of the present disclosure provides users with adequate control and exposes how third-party applications use their private data. Moreover, the message filters 110 may be used to write security policies to protect money costing services such as, for example, short message services (SMSs), phone calls, and the like. Additionally, the message filters 110 are generic enough to handle a wide range of security issues.

Figure 2:
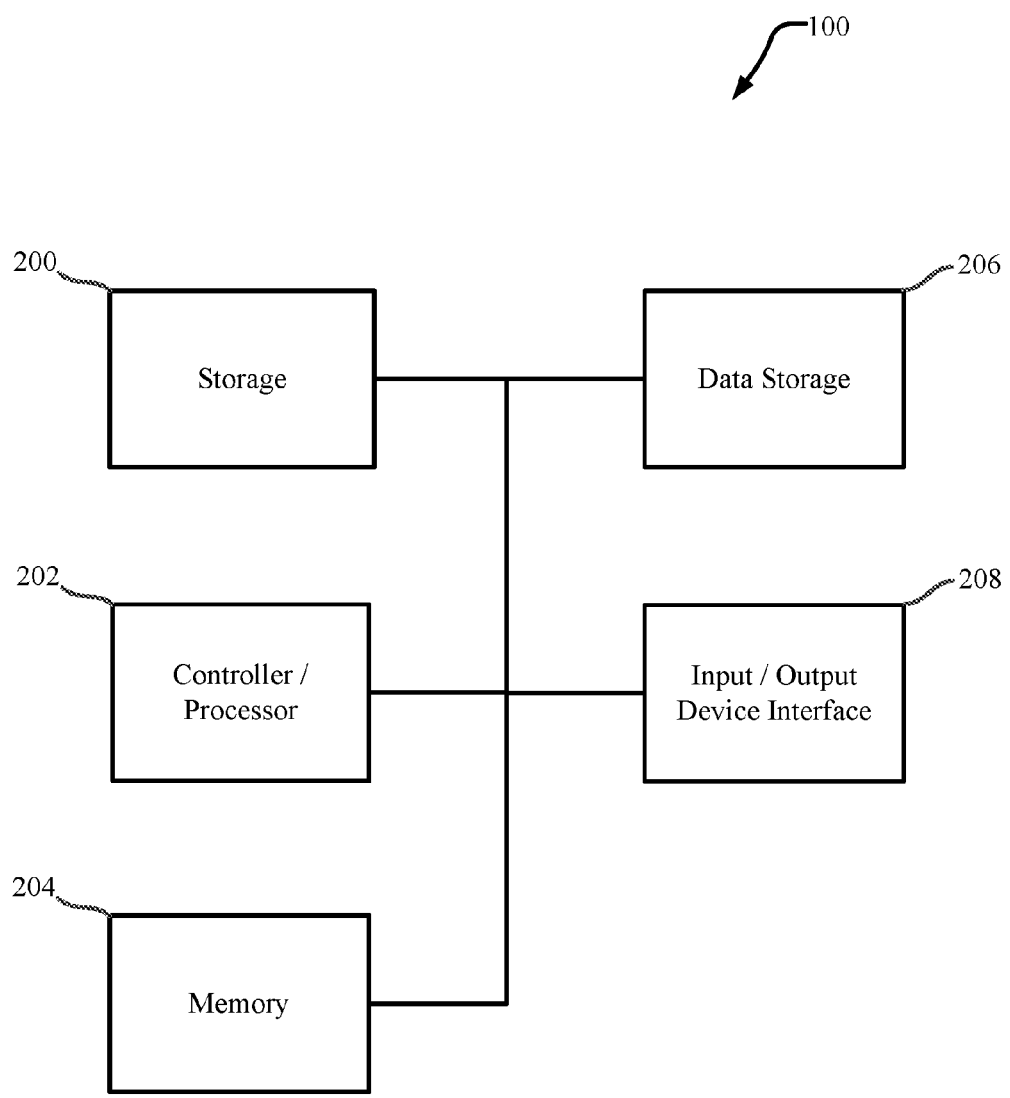
FIG. 2 is a block diagram of a device for utilizing a data flow tracking filter to track sensitive data according to the present disclosure.

FIG. 2 illustrates a block diagram having example components of a device 100 according to the present disclosure. The device 100 may include computer-readable and computer-executable instructions that reside in a storage 200 on the device 100. The device 100 may be a smart device, such as a smart object capable of connecting to a network or the internet. Examples of smart devices may include computers (e.g., a desktop, a laptop, a server or the like) and portable devices (e.g., an electronic reader, smart phone, tablet, smart watch or the like), for example.

The device 100 may include one or more controllers/processors 202 comprising one-or-more central processing units (CPUs) for processing data and computer-readable instructions and a memory 204 for storing data and instructions. The memory 204 may include volatile random access memory (RAM), non-volatile read only memory (ROM), non-volatile magnetoresistive (MRAM) and/or other types of memory. The device 100 may also include a data storage component 206 for storing data and processor-executable instructions. The data storage component 206 may include one or more non-volatile storage types such as magnetic storage, optical storage, solid-state storage, etc. The device 100 may also be connected to a removable or external non-volatile memory and/or storage through input/output device interfaces 208. The input/output device interfaces 208 may be configured to operate with a network, for example a wireless local area network (WLAN) (such as WiFi), Bluetooth, zigbee and/or wireless networks, such as a Long Term Evolution (LTE) network, WiMAX network, 3G network, etc. The network may include a local or private network or may include a wide network such as the Internet. Devices may be connected to the network through either wired or wireless connections.

Depending upon complexity of the device 100, the device 100 may omit components illustrated in FIG. 2 or may include other components not illustrated.

Executable instructions for operating the device 100 and its various components may be executed by the controller(s)/processor(s) 202, using the memory 204 as temporary "working" storage at runtime. The executable instructions may be stored in a non-transitory manner in non-volatile memory 204, storage 200, or an external device. Alternatively, some or all of the executable instructions may be embedded in hardware or firmware in addition to or instead of software.

The concepts disclosed herein may be applied within a number of different devices and computer systems, including, for example, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Figure 3:
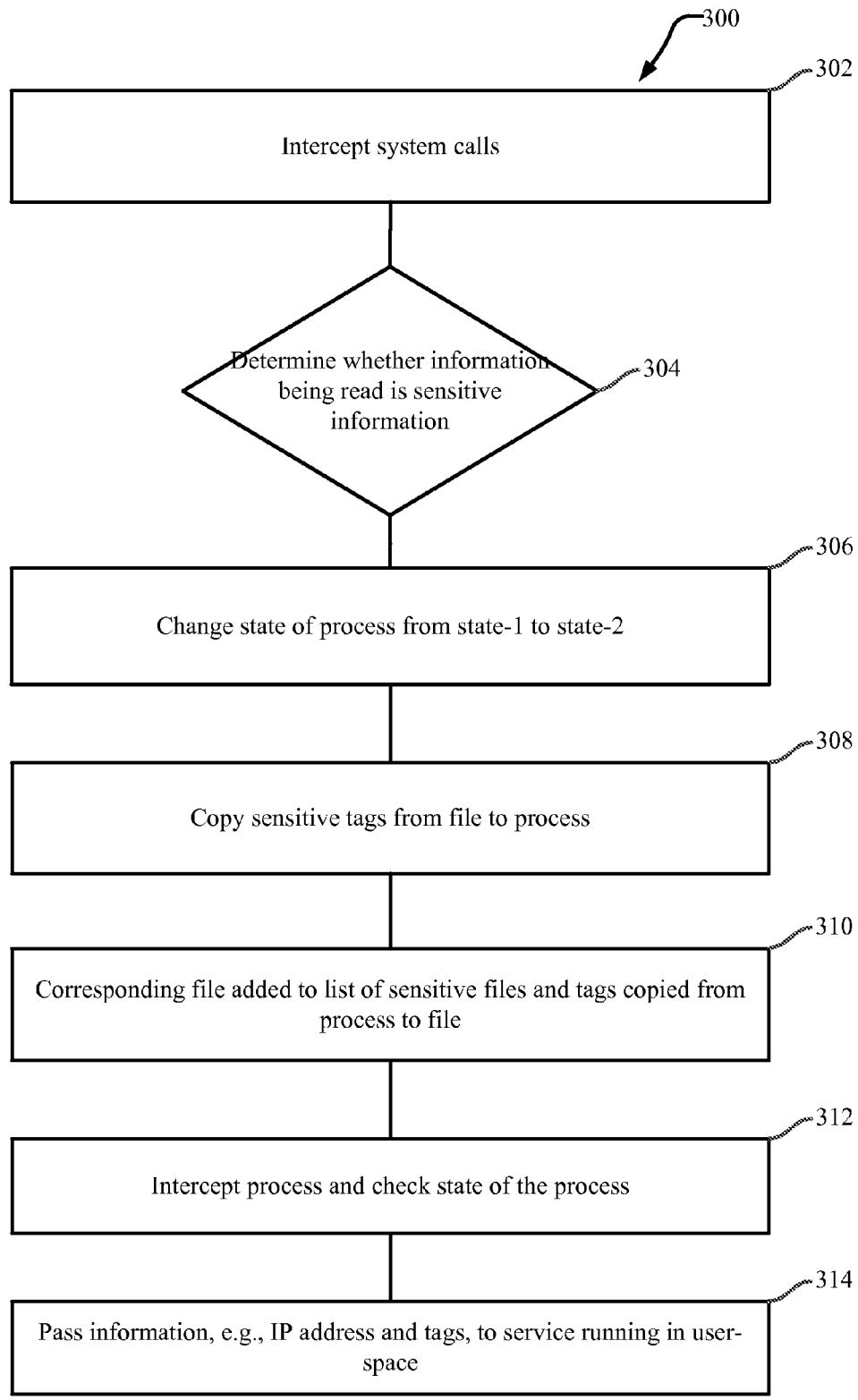
FIG. 3 is a process flow diagram of a method for tracking information flow in an ANDROID® operating system operated device according to the present disclosure.

FIG. 3 illustrates a method 300 for tracking information flow in an ANDROID® operating system operated device. At block 302 message filters intercept system calls. At block 304 the message filters determine whether the information being read is sensitive information. If the information being read is sensitive, a state machine changes a state of the process from state-1 to state-2 (illustrated as block 306). At block 308 sensitive tags are copied from the file to the process. If the process in state-2 performs a write, then the corresponding file is added to a list of sensitive files and tags are copied from the process to the file (illustrated as block 310). If the process invokes a send( ) system call, the filter intercepts it and checks the state of the process (illustrated as block 312). If the process is in state-2, then the filter passes the relevant information, e.g., IP address and tags, to a service running in a user-space, which notifies the user by displaying an alert (illustrated as block 314).

As used in this disclosure, the term "a" or "one" may include one or more items unless specifically stated otherwise. Further, the phrase "based on" is intended to mean "based at least in part on" unless specifically stated otherwise.

The present disclosure is in no way restricted to the specific disclosure of the specification and drawings, but also encompasses any modifications within the scope of the appended claims.

What is claimed is:

1. A device for tracking sensitive data using a data flow tracking filter implemented with the device operating system, comprising:
   a memory storing computer-executable instructions;
   a processor for processing the computer-executable instructions to provide:
      a userspace including an application running on the operating system; and
      a kernelspace comprising:
         a system call wrapper in communication with the application, the system call wrapper receiving a system call from the application;
         a plurality of message filters in communication with the system call wrapper, the plurality of message filters intercepting the system call and determining whether information read by the system call is sensitive, the plurality of message filters further alerting a user when a process flagged as containing sensitive information invokes a send system call; and
         a state machine in communication with the plurality of message filters, the state machine changing a state of the process when the system call is reading sensitive information.

2. The device of claim 1 wherein the userspace further comprises:
   a policy daemon in communication with the message filters, the policy daemon loading and unloading the message filters.

3. The device of claim 2 wherein the policy daemon communicates with a user interface to seek instructions from a user when the message filters do not achieve a conclusive permit/deny decision.

4. A method for tracking information flow in a device including an operating system, comprising:
   intercepting, by message filters in a kernelspace, system calls;
   determining, by the message filters in the kernelspace, whether information being read is sensitive information;
   changing, by a state machine in the kernelspace, a state of a process;
   copying, by the message filters in the kernelspace, sensitive tags from a file to the process;
   adding, by the message filters in the kernelspace, a corresponding file to a list of sensitive files;
   copying, by the message filters in the kernelspace, tags from the process to the corresponding file;
   intercepting, by the message filters in the kernelspace, the process;
   checking, by the message filters in the kernelspace, a state of the process; and
   passing, by the message filters in the kernelspace, information to a service running in a userspace.

* * * * *